United States Patent
Shvarts et al.

(10) Patent No.: US 9,602,546 B2
(45) Date of Patent: Mar. 21, 2017

(54) ACCURATE LICENSE COUNTING IN SYNCHRONIZED SERVERS

(71) Applicant: Flexera Software LLC, Itasca, IL (US)

(72) Inventors: Ann Shvarts, San Jose, CA (US); Vikram Venkata Koka, Fremont, CA (US)

(73) Assignee: Flexera Software LLC, Itasca, IL (US)

( * ) Notice: Subject to any disclaimer, the term of this patent is extended or adjusted under 35 U.S.C. 154(b) by 0 days.

(21) Appl. No.: 14/821,159

(22) Filed: Aug. 7, 2015

(65) Prior Publication Data

US 2017/0041346 A1 Feb. 9, 2017

(51) Int. Cl.
*H04L 29/06* (2006.01)
*G06F 21/10* (2013.01)

(52) U.S. Cl.
CPC ............ *H04L 63/20* (2013.01); *G06F 21/105* (2013.01); *H04L 63/08* (2013.01)

(58) Field of Classification Search
CPC .... G06F 21/31; G06F 21/6218; G06F 21/604; H04L 63/08; H04L 63/083; H04L 9/32; H04L 63/0861; H04L 63/20; H04L 63/102; H04L 63/0227
USPC ........................................ 726/1, 7
See application file for complete search history.

(56) References Cited

U.S. PATENT DOCUMENTS

| 8,516,090 B1* | 8/2013 | Welch ............... G06F 21/10 709/221 |
| 2014/0026222 A1* | 1/2014 | Koka ............... G06F 21/10 726/26 |
| 2014/0136416 A1* | 5/2014 | Koka ............... G06Q 30/06 705/44 |

* cited by examiner

*Primary Examiner* — Baotran N To
(74) *Attorney, Agent, or Firm* — Perkins Coie LLP

(57) ABSTRACT

Several embodiments include a policy-bound token distribution system. The system can include a back-office server that issues policy-bound tokens to local main distribution servers. A local main distribution server can distribute a policy-bound token to a digital environment to authorize an operator to take advantage of a protected resource. The system can rely on a backup server to distribute the policy-bound tokens whenever the distribution service of the local main distribution server is unavailable. To prevent run-time leakage from the backup server, the backup server can synchronize its distribution state with the local main distribution server and the back-office server. The distribution state can include distribution transaction records between the backup server and client devices. Throughout the system, each distribution transaction record can be assigned unique transaction ID to prevent multiple accounting of the same distribution transaction record from different servers.

6 Claims, 7 Drawing Sheets

US 9,602,546 B2

ACCURATE LICENSE COUNTING IN SYNCHRONIZED SERVERS

RELATED FIELD

This disclosure relates generally to a digital supply management system, and in particular to a license management system.

BACKGROUND

Digital supply management, such as digital rights management, faces some unique challenges. For example, digital rights management can include transactions of digital rights relating to device functionality, capability usages (e.g., application module usage or hardware module usage), other electronic services. The digital rights can authorize a quantifiable usage (e.g., by duration, usage count, input or output amount, etc.) of a protected resource (e.g., a functionality, an application, a device, a module, or a service) enabling participation or engagement in a digital activity on an end-user computing device. In these cases, the sellers of the transactions are publishers or issuers, who control and/or restrict access to the protected resources. What is being sold in a transaction of digital right can be referred to as a "license." For example, the license can be embodied as a digital string used to verify grant of the digital rights and unlock one or more resources protected by a control kernel.

Conventional digital rights management utilizes a centralized manager system (e.g., a back-office system) controlled by a vendor/publisher of the licenses to communicate with any device that uses the license. In turn, each of these devices implements a control kernel that restricts access to its one or more protected resources unless a verifiable license indicating a relevant digital right is presented to the control kernel. The publisher or issuer of the protected resources can sell and distribute licenses directly or indirectly to customers. The licenses can then serve as keys to the usage of the applications, services, or functionalities. The control kernels can validate the key periodically with the centralized manager system.

An enterprise customer can have a license server that stores transaction records of licenses in a trusted storage (TS), where each license can grant an end-user computing device some form of digital access. If a license server goes down, the end devices may not be able to get the licenses from the license server. An enterprise would run a back-up server so the clients can switch to it if the main server fails. However, the enterprise customers cannot always ensure that the licensing state of main server when brought back online after the failure is identical to the state of the back-up server at this moment. Even in the situation where the enterprise restores the main server state from the data stored in the back-office, the main server might be missing the data from the back-up server created during the main server black-out. This dilemma impairs the robustness of the digital supply management system, causing either the issuers of the licenses to take risk in trusting the recovered licensing server or the customers to take risk in possibly losing purchased licenses in the event of device failures. Thus, the conventional architecture for a digital supply management system cannot always be trusted during device failure events.

SUMMARY

Disclosed is a digital supply management system for managing electronic records (e.g., usage records) of an inventory across inventory management nodes (e.g., local main distribution servers or local backup distribution servers). For example, the inventory can include licenses, other form of digital rights certificate or access granting keys, regenerative product or services (e.g., virtual items, service subscriptions, pay-per-use contracts), passwords and cryptographic parameters, digital financial instruments, or any combination thereof (collectively, the "digital inventory assets"). In some embodiments, the inventory can also include computational hardware, electronic equipment, rentals, real estate space, physical goods (collectively, the "physical inventory assets"). In these embodiments, the digital supply management system can maintain the electronic records of the physical inventory assets by issuing verifiable digital representations of these assets. While many types of inventory assets are contemplated in this disclosure, this disclosure uses the inventory management of digital inventory assets, and particularly licenses, to exemplify how the digital supply management system can be used.

Similar to physical inventory accounting, it is also possible for electronic records of digital assets to be miscounted (e.g., intentionally or otherwise). Unlike physical inventory, digital assets can actually be copied and stored in multiple computing devices and storage devices, even though the digital rights associated with the digital assets are intended to be only applied a limited number of times (e.g., according to a usage policy controlled by an issuer or publisher of the digital asset). In several embodiments, these types of digital assets can be referred to as "policy-bound tokens."

The disclosed digital supply management system can manage license rights by provisioning verifiable "licenses" from a back-office to one or more intermediary local license servers, which thereby distribute the licenses to end-user devices. Agent applications running on the end-user devices can verify a license against one of the local license servers to derive a benefit from the license. In some embodiments, the disclosed system provides a flexible model of license deployment (e.g., planned deployment or dynamic license deployment) that does not rely on "binding" license rights to the physical characteristics of a machine or relying on storing "hidden" information on the machine. The inventory management nodes can include a publisher/vendor server (e.g., the back-office system) or local license servers. The inventory management nodes can be coupled to at least a subset of one another via one or more network connections. In some embodiments, some of the inventory management nodes can be interconnected via one or more local networks without a persistent Internet connection to the back-office system.

The disclosed architecture for managing electronic inventory records enables improved security in situations when a distribution server (e.g., a license distribution server) storing a trusted storage containing digital inventory assets (e.g., licenses) experiences a catastrophic failure. The disclosed architecture achieves the improved security by synchronizing electronic inventory records among a back-office system, two or more local main distribution servers, and one or more backup distribution servers. Each of the inventory management nodes can have a trusted storage that stores a distribution state indicating one or more distribution transaction records involving distribution of its own and other servers' digital assets. For example, a local distribution server and a local backup distribution server can share the same set of licenses, with only one of the servers being active at a time. In several embodiments, by synchronizing with each other, the local distribution server and the local backup distribution server can avoid serving extra licenses (e.g., more than what is available according to a policy). That is, the disclosed architecture enables the computing devices in the digital supply management system to act as record backup for one another and maintain a balanced accounting of the electronic records along the distribution hierarchy. Each inventory management node can serve as a safeguard against failure or otherwise unavailability of distribution services provided by other management nodes.

In the disclosed architecture, a back-office system, two or more local main distribution servers, and/or one or more local backup distribution servers can each update at least a portion of its own distribution state (e.g., transaction records of the distribution of licenses or policy-bound tokens) whenever it performs a distribution transaction (e.g., granting a license to an end-user device) and/or whenever it receiving one or more distribution states from one another. In some embodiments, the local main distribution servers or the local backup distribution servers can report their distribution states to the back-office system. In these embodiments, the back-office system can restore distribution states of a local main distribution server and/or a local backup server during a failure recovery scenario. For example, when a backup server receives a distribution state involving one or more distribution transaction records of a local main server, the local backup server can individually apply each distribution transaction of the records to incorporate the state of main server into its state. For another example, when a main server receives a distribution state involving one or more distribution transaction records of a backup server, the main server can individually apply each distribution transaction of the records to incorporate the state of backup server to its state. Each server or system can synchronize its distribution state containing distribution transaction records with one another. This synchronization process prevents run-time leakage (e.g., policy-bound token leakage or license leakage) to occur. For example, with this comprehensive synchronization process, a local backup distribution server for a local main distribution server is capable of maintaining an availability count of how many licenses it can distribute based on how many licenses the local main distribution server has distributed already.

In several embodiments, the back-office server faces the challenge of duplicate accounting. To solve this, a server in the digital supply management system can generate a unique transaction ID whenever the server updates its distribution state. By detecting repeats in transaction IDs of distribution transaction records, the back-office server is able to remove any duplicate transaction in its distribution state (e.g., in the customer usage data). This is advantageous, for example, because the reduction of duplicate accounts can reduce the likelihood of pay-per-use double billing.

Some embodiments of this disclosure have other aspects, elements, features, and steps in addition to or in place of what is described above. These potential additions and replacements are described throughout the rest of the specification

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A "license" here refers to a digital permit from a trusted authority granting a right to use an application or service via a computing device or to allow a digital activity to take place on a computing device. The license may be embodied as one or more digital strings used to verify grant of the digital right. A license can dictate who can use the application or service and how the application or service can be used (e.g., what functions or capabilities are available to the licensee and/or how many times the licensee can use the functions or capabilities). A license can have the attributes of whether the digital right is transferable (e.g., whether the buyer of the license can grant all rights associated with the license to another entity), modifiable (e.g., enabling a licensee to change portions of who and how the application or service can be used), movable (e.g., whether the license applied to a first computing device can be change to a second computing device), replicable (e.g., whether the licensee has a limited right to create another instance of the license), etc. A "trusted storage" herein refers to a secure storage of data. For example, the trusted storage can store distribution transaction records and/or policy-bound tokens (e.g., licenses) for distribution.

Figure 1:
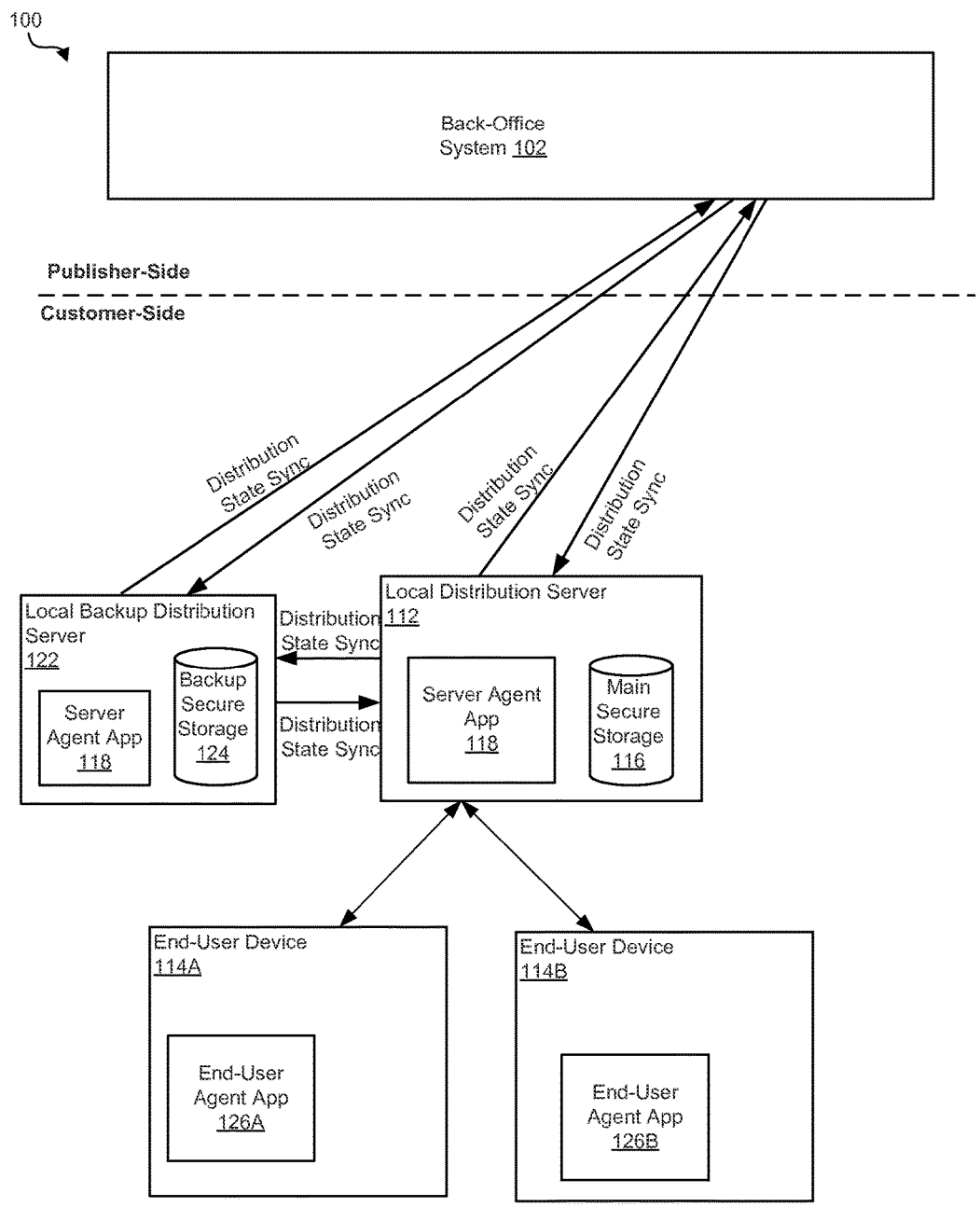
FIG. 1 is a data flow diagram illustrating a synchronization process for a digital supply management system, in accordance with various embodiments.

FIG. 1 is a data flow diagram illustrating a synchronization process for a digital supply management system 100, in accordance with various embodiments. The servers and devices described in the digital supply management system 100 can be implemented as instances of the computer system 700 of FIG. 7. While the digital supply management system 100 can manage an inventory of other digital assets, licenses are used below to exemplify how distribution of such digital assets can be managed. For example, the digital supply management system 100 can be a digital license platform.

The digital supply management system 100 can include a back-office system 102. The back-office system 102 can be one or more computing devices that represent a publisher (e.g., a vendor or an issuer) of licenses that can be distributed in bulk. These functional components of the back-office system 102 can be implemented on separate computing devices, or share one or more host devices. The back-office system 102 can communicate with one or more management nodes, such as a local main distribution server 112. The back-office system 102 can include one or more enterprise modules to organize how resources, including licenses, are distributed. The back-office system 102 can store and manage entitlement information related to the distribution of the licenses (e.g., distribution history of the licenses) such that policies associated with the distributed resources can be enforced.

The back-office system 102 can receive requests from the local main distribution server 112 for provisioning one or more licenses. In response to a request, the back-office system 112 can verify that the requirements are met according to a license distribution policy, such as processing of a payment via an internal or external payment system. The back-office system 102 can verify, confirm, and/or register an electronic transaction to distribute one or more licenses based on a license request.

For example, the local main distribution server 112 can generate a license request for a group of licenses. The local main distribution server 112 can send the license request to the back-office system 102. The back-office system 102 can process the license request, assign the group of licenses to the local main distribution server 112, and distribute the group of licenses to the local main distribution server 112 via a first electronic transaction. As the back-office system 102 confirms the license request, the back-office system 102 can maintain a distribution record of the first electronic transaction.

After the completion of the first electronic transaction, the local main distribution server 112 can distribute at least a subset of the group of licenses to one or more end-user devices (e.g., an end-user device 114A, an end-user device 114B, etc., collectively as the "end-user devices 114") connected therewith. In some embodiments, the local main distribution server 112 can be responsible for a distinct group of end-user devices 114. The subsequent distribution of the licenses can occur via one or more electronic transactions, such as a second electronic transaction of a first subgroup of the licenses to the end-user device 114A and a third electronic transaction of a second subgroup of the licenses to the end-user device 114B. The local main distribution server 112 can maintain its own distribution records of these electronic transactions subsequent to the first electronic transactions that sourced its supply of the licenses. For example, these distribution records can be maintained in a main secure storage 116 within the local main distribution server 112. In several embodiments, the digital supply management system 100 can include more than two local distribution servers that play equal role and share their distribution state with each other. In several embodiments, the digital supply management system 100 can include multiple pairs of local main and backup distribution servers.

The main secure storage 116 can be managed by a server agent application 118. The server agent application 118 can ensure that the distribution records within the main secure storage 116 are not modified without authority and authentication.

In some cases, in order for a central policy (e.g., billing policy) defined in the back-office system 102 to be enforced, the back-office system 102 maintains a precise and accurate database reflecting all distribution records distributed therefrom. For example, this database can be used for billing purposes (e.g., if a customer pays for actual usage rather than the fixed amount of license). Accordingly, the local main distribution server 112 reports transaction records (e.g., license distribution records) in the main secure storage 116 back to the back-office system 102. For example, this report-back action can be used for monitoring or billing, depending on the publisher/vendors business model.

To ensure that proper enforcement is not completely dependent on the full functioning of the local main distribution server 112, the digital supply management system 100 can include one or more backup servers (e.g., a local backup distribution server 122). For example, the local main distribution server 112 can push the transaction records in the main secure storage 116 to a backup secure storage 124 of the local backup distribution server 122. In various deployment scenarios, a customer of the back-office system 102 can control both the local main distribution server 112 (e.g., in a main server group) and the local backup distribution server 122 (e.g., in a backup server group). If the local main distribution server 112 is on-line, end-user agent applications (e.g., an end-user agent application 126A, an end-user agent application 126B, etc., collectively as the "end-user agent applications 126") on end-user devices 114 are configured to contact the local main distribution server 112 for licenses. However, when a local main distribution server is unavailable, then the end-user agent applications 126 are configured to switch the backup server, such as the local backup distribution server 122, until the distribution service of the local main distribution server 112 is available once more.

In the basic implementations, a local main distribution server sends its distribution records to the local backup distribution server 122, which maintains the backup secure storage 124. This can result in the backup secure storage 124 storing an identical distribution state as the main secure storage 116. When the local main distribution server 112 becomes unavailable, the end-user agent applications 126 start to send requests to the local backup distribution server 122, which stores and serves licenses from the same state as a last known state of the local main distribution server 112.

In some implementations, synchronization to and/or from the back-office system 102 is enabled. In these cases, the back-office system 102 accumulates data about license distribution activities of the local main distribution server 112. The back-office system 102 can push this data to the local main distribution server 112 (e.g., to restore its state after catastrophic failure). That is, the back-office system 102 sends the latest server data from the back-office system 102 to the local main distribution server 112. This is used in recovery use cases when one or more of the local distribution servers get disabled or if at least a subset of the main secure storage 116 gets lost or corrupted. Through synchronization from the back-office system 102, the one or more of the local distribution servers can restore itself/themselves to a last known state.

In basic implementations of the digital supply management system 100, there are at least three basic synchronization processes including reporting a local main distribution server's activities to the back-office system 102, restoring the states of the local main distribution server 112 from data stored in the back-office system 102, and duplicating the state of the local main distribution server 112 to the local backup distribution server 122 for failover support. In these basic implementations, data from the local main distribution server 112 is sent to and from the back-office system 102 and data from the local main distribution server 112 is sent to the local backup distribution server 122. However, in these basic implementations, client activities on the local backup distribution server 122 are not reported to the back-office system 102 or the local main distribution server 112 (e.g., during the local main distribution server 112's black out).

One of the challenges under the basic implementations is that shorter borrow intervals are required. The basic implementations are sufficient for short borrow intervals. Borrow interval limits the license duration on an end-user device and requires the end-user device to reacquire licenses from the local main distribution server 112 before the expiration of the borrow interval. The shorter the borrow interval is, the more likely that a local main distribution server cannot stay in an overage state for a long time.

In certain scenarios, a vendor policy may require that only one of multiple "concurrent licenses" (e.g., a primary license and its one or more backup copies) should be distributed and activated. Under an overage state, more than one of the "concurrent licenses" are activated. A failover scenario (e.g., in a basic implementation) can cause an overage state. This situation can occur because the counts of licenses (e.g., licenses activated from the backup server) do not get depleted from the main server state over repeated usage. In one example, an end-user device can receive counts of licenses from the local main distribution server 112, return the licenses, and then acquire the same counts again. In another example, an end-user device can return the counts of licenses, and another end-user device can acquire those returned counts. These processes can be repeated indefinitely. The total count of the licenses available to all end-user devices (e.g., at any given time) according to the vendor policy does not change over time.

Conventionally, the overage state problem associated with concurrent licenses is solved by short borrow interval forces the end-user devices 114 to connect frequently to the local main distribution server 112 to renew the licenses. When a local main distribution server is in overage state, renew requests will be denied until the distributed licenses get within the limit of available licenses and the licensing server gets out of the overage state. When the local main distribution server 112 implements a borrow interval policy, then the local main distribution server 112 can configure the borrow interval policy to ensure that an overage state does not last longer than a single borrow interval. This ensures that one or more license customers do not take advantage of the overage state for a long time.

Another mechanism to overcome the overage states includes implementing a maintenance window. The maintenance window defines how long the local backup distribution server 122 can be active. Setting maintenance window to a relatively short period limits the amount of unreported licensing activities at the local backup distribution server 122. Both the borrow interval policy and the maintenance window policy can mitigate the problem of overage states in a concurrent license model by limiting possibility and duration of overage states. For example, in a pay-per-view use case (e.g., under a concurrent license model or a metered license model), unreported usage is unacceptable according to the vendor policy. That is, the vendor would lose revenue when a license usage accounting is not accurate. In those situations, data in the local backup distribution server 122 would have to be communicated back to the local main distribution server 112 and the back-office system 102.

In several embodiments, the digital supply management system 100 can implement advanced synchronization processes to overcome challenges associated with the basic implementations. These advanced synchronization processes include synchronization of distribution records between the local backup distribution server 122 and the local main distribution server 112 (e.g., from the local backup distribution server 122 to the local main distribution server 112). For example, the local backup distribution server 122 can be provisioned with concurrent licenses that are shared with the local main distribution server 112. This resolves the problem of a temporary overage of distributed licenses because the local main distribution server 112 would now have records of consumption that happened on the local backup distribution server 122 while the local main distribution server 112 is down. In several embodiments, synchronization of distribution records can include maintaining and tallying the distribution records in all inventory management nodes (e.g., the back-office system 102, the local main distribution server 112, and the local backup distribution server 122) in each of the inventory management nodes. This is achieved by letting each inventory management node synchronize its own distribution records with each other. This comprehensive synchronization minimizes the loss of data when at least one of the inventory management nodes fails to perform or complete synchronization operation. In several embodiments, inter-server bandwidth can be conserved by communicating only an inventory management node's own distribution transaction records during synchronization with the other tiers or nodes. When distribution servers communicate with each other, they send only their own records and data out. When the local distribution servers communicate with the back-office, they send as much data as they have (e.g., because there is no guarantee that other servers had a chance to send their distribution state to the back-office before failure).

If a distribution service of a local main distribution server (e.g., the local main distribution server 112) or the local backup distribution server 122 becomes unavailable, then the distribution state of the server with the unavailable service has to be restored. In response, the back-office system 102 can send the combined distribution states from both servers (e.g., the local main distribution server 112 and the local backup distribution server 122) to the server with the unavailable service. This way, all served licenses are taken into account and no overage can occur during the restoration process.

This approach helps with in a pay-per-use or pay-per-view use case because all use of licenses is reported regardless of what server has distributed/granted the licenses. However, these additional synchronization processes create a new challenge for the back-office system 102 that will now receive duplicate information from both the local main distribution server 112 and the local backup distribution server 122. Without removing duplicate usage records from the back-office system 102, the back-office system 102 cannot provide an accurate bill to the customers.

To facilitate removal of duplicate usage records, whenever an inventory management node updates a distribution state with a newly recorded distribution transaction record (e.g., indicating granting or distribution of one or more licenses to an end-user device), the inventory management node can also assign a unique identifier to the distribution transaction record. This unique identifier can be referred to as a "transaction ID." In several embodiments, the transaction ID is automatically assigned by the server initiating the distribution transaction. In several embodiments, every client interaction (e.g., by an end-user device) with the inventory management nodes results in a new distribution transaction record and a single transaction ID assigned thereto. The server initiating the distribution transaction can store the transaction ID together with the distribution transaction record. When the back-office system 102 collects the distribution states from its subsidiary inventory management nodes (e.g., the local main distribution server 112 and the local backup distribution server 122), the back-office system 102 can use transaction IDs of the distribution transaction records to identify and remove duplicate usage reports and assemble the correct set of licensing transactions from the inventory management nodes.

In several embodiments, the synchronization processes amongst the inventory management nodes for the licenses or other type of digital assets can be performed in batches. For example, synchronizing of a distribution state of an inventory management node to another node may be according to a schedule (e.g., a periodic schedule or a non-linear schedule). When a scheduled time is met, an inventory management node can initiate a synchronization process to send its distribution state to another node or to all other nodes in its supply chain (e.g., a chain of inventory management nodes responsible for distributing one or more licenses). For another example, synchronizing of a distribution state of an inventory management node to another node may be triggered by a contextual condition (e.g., a threshold number of new distribution transactions recorded) or a server event (e.g., failure to connect with another inventory management node or detection of an impending error). When a contextual condition or server event is met, an inventory management node can initiate a synchronization process to send its distribution state to another node or to all other nodes in its supply chain (e.g., a chain of inventory management nodes responsible for distributing one or more licenses). The frequency and pagination of the synchronization process can be configurable.

Figure 2:
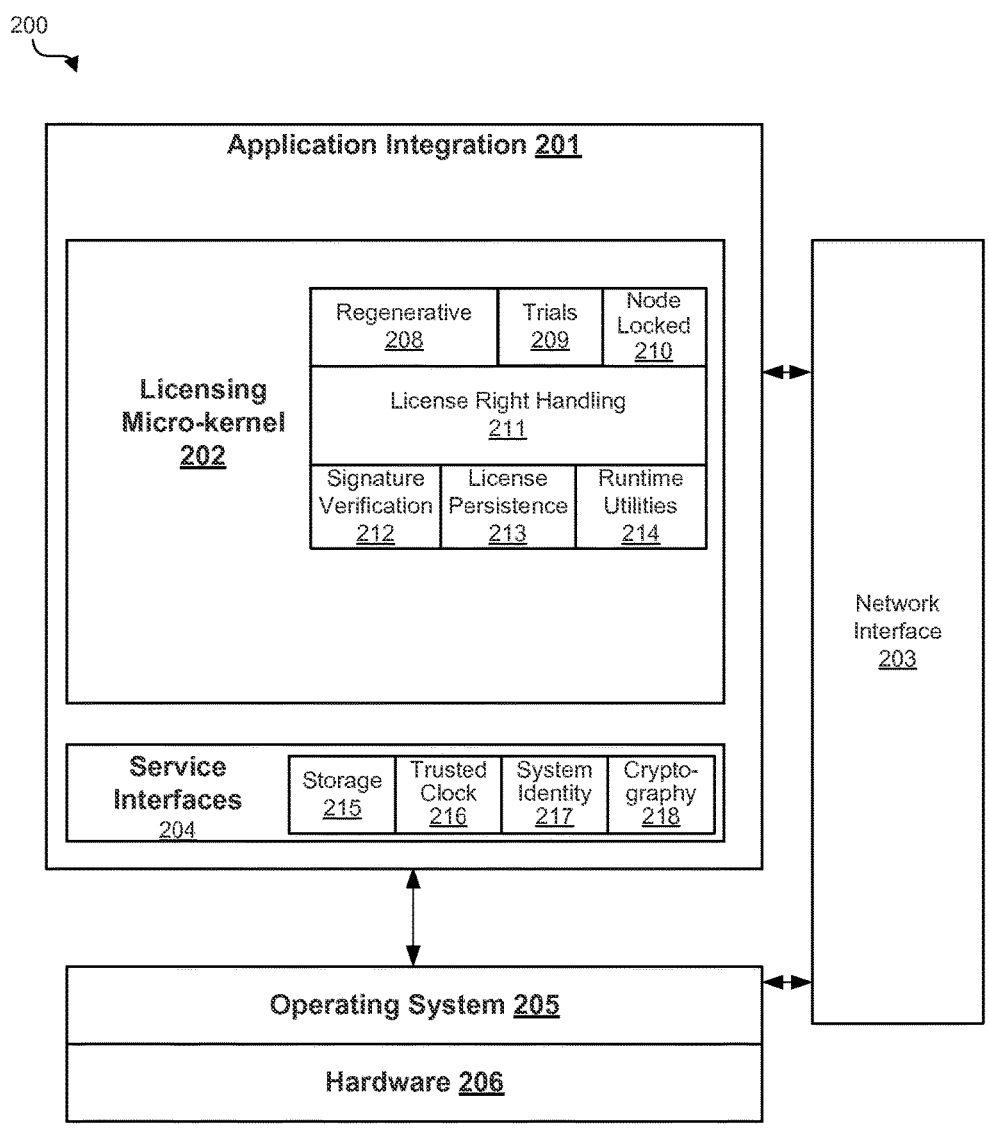
FIG. 2 is a block diagram illustrating an exemplary client device to enforce license rights, in accordance with various embodiments.

FIG. 2 is a block diagram illustrating an exemplary client device 200 (e.g., the end-user devices 114 of FIG. 1) to enforce license rights, in accordance with various embodiments. The client device 200 can implement an application integration module 201. The application integration module 201 may include a licensing micro-kernel 202 and service interfaces 204. The application integration module 201 can use hardware 206 (e.g., hardware components or capabilities) and an operating system 205 implemented on the client device 200.

Activation of a function or a capability on the client device 200 can involve a network interface 203 for communication between the client device 200 and a license server (e.g., the local main distribution Server 112 or the local backup distribution Server 122 in FIG. 1). In at least one embodiment, the licensing micro-kernel 202 is delivered by the provider as pre-built libraries, with services included that can be broken out as separate services, such as a signature verification module 212, a license persistence module 213, and runtime utility modules 214.

The signature verification module 212 is a logical module that verifies cryptographic signatures within a license (e.g., a feature line indicating that a particular function or capability is granted by the license). The signature verification module 212 assures the authenticity of the feature lines and prevents license tampering. The license persistence module 213 securely stores regenerative and trial license rights on the client device 200. Regenerative license rights are stored on the device so the capabilities are available in-between regenerations from the management server. Information about trial license rights stored on the client device 200 to ensure proper expiration. Runtime utility modules 214 represent wrappers around runtime functions, where the wrappers are used to provide encapsulation from various implementations of customizable operating systems calls.

In at least one embodiment, the licensing micro-kernel 202 handles license rights (e.g., via a license right handling module 211), and processes and maintains license rights of various models. Some supported license models may include a trial model 209, a regenerative model 208, and a node locked model 210. The trial model 209 includes license rights available for a specified duration of time. The regenerative model 208 specializes in the continuous license rights updates from a root of trust (e.g., directly from the root of trust or a distribution server granted the right to act as an agent of the root of trust) to the client device 200. The node locked model 210 specializes in the license rights locked to a given device or node.

The client device 200 can further include interfaces for a storage device 215, a trusted clock 216 (e.g., when time verification is part of a licensing condition), a system identity 217 (e.g., a unique device identifier), and cryptography module 218. The trusted clock 216 can provide an accurate system time to the licensing micro-kernel 202. This can help prevent unauthorized use of expired licenses. The storage device 215 can store license rights for the client device 200 including the accounting information and distribution hierarchy information associated with such license rights. That is, the storage device 215 can be the trusted storage of the client device 200. The cryptography module 218 can store cryptographic parameters in the storage device 215. For example, the client device 200 can receive cryptographic parameters (e.g., public keys) from a distribution server or the root of trust.

Figure 3:
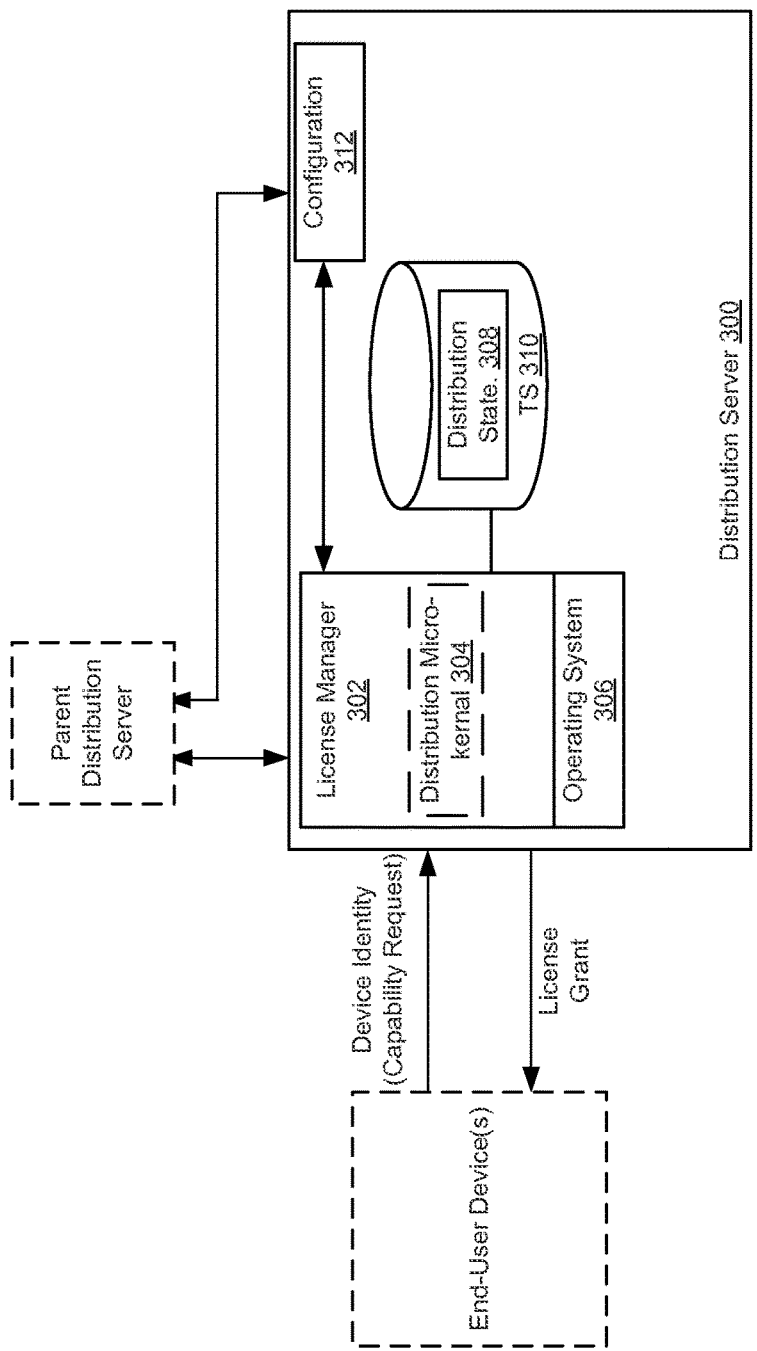
FIG. 3 is a block diagram illustrating an exemplary distribution server in a digital supply management system, in accordance with various embodiments.

FIG. 3 is a block diagram illustrating an exemplary distribution server 300 (e.g., the local main distribution server 112 of FIG. 1 or the local backup distribution server 122 of FIG. 1) in a digital supply management system (e.g., the digital supply management system 100 of FIG. 1), in accordance with various embodiments. The distribution server 300 includes a license manager 302, a distribution micro-kernel 304, and an operating system (OS) 306. The license manager 302 and the distribution micro-kernel 304 handle license rights. The distribution server 300 stores a distribution state 308 involving one or more distribution transaction records in a trusted storage 310. A parent distribution server can provision licenses by communicating a bulk license message (e.g., including licenses) to the distribution server 300. The licenses and the distribution state 308 involving distribution transactions of the licenses can be stored in the trusted storage 310. The parent distribution server can further communicate a configuration message to a configuration module 312 on the distribution server 300. For example, the configuration message can indicate the frequency of propagating back updates of the trusted storage 310 and the frequency of license verification with the parent distribution server.

Regarding FIG. 1, FIG. 2 and FIG. 3, portions of components and/or modules described therein may each be implemented in the form of special-purpose circuitry, or in the form of one or more appropriately programmed processors, or a combination thereof. For example, the modules described can be implemented as instructions on a tangible storage memory capable of being executed by a processor or a controller in the control circuitry. The tangible storage memory may be volatile or non-volatile memory. In some embodiments, the volatile memory may be considered "non-transitory" in the sense that it is not transitory signal. Modules may be operable when executed by a processor or other computing device, e.g., a single board chip, application specific integrated circuit, a field programmable field array, a network capable computing device, a virtual machine terminal device, a cloud-based computing terminal device, or any combination thereof. Memory space and storages described in the figures can be implemented with the tangible storage memory as well, including volatile or non-volatile memory.

Each of the modules and/or components may operate individually and independently of other modules or components. Some or all of the modules may be executed on the same host device or on separate devices. The separate devices can be coupled together through one or more communication channels (e.g., wireless or wired channel) to coordinate their operations. Some or all of the components and/or modules may be combined as one component or module.

A single component or module may be divided into sub-modules or sub-components, each sub-module or sub-component performing separate method step or method steps of the single module or component. In some embodiments, at least some of the modules and/or components share access to a memory space. For example, one module or component may access data accessed by or transformed by another module or component. The modules or components may be considered "coupled" to one another if they share a physical connection or a virtual connection, directly or indirectly, allowing data accessed or modified from one module or component to be accessed in another module or component. In some embodiments, at least some of the modules can be upgraded or modified remotely. The client device 200 and the distribution server 300 may include additional, fewer, or different modules for various applications.

Figure 4:
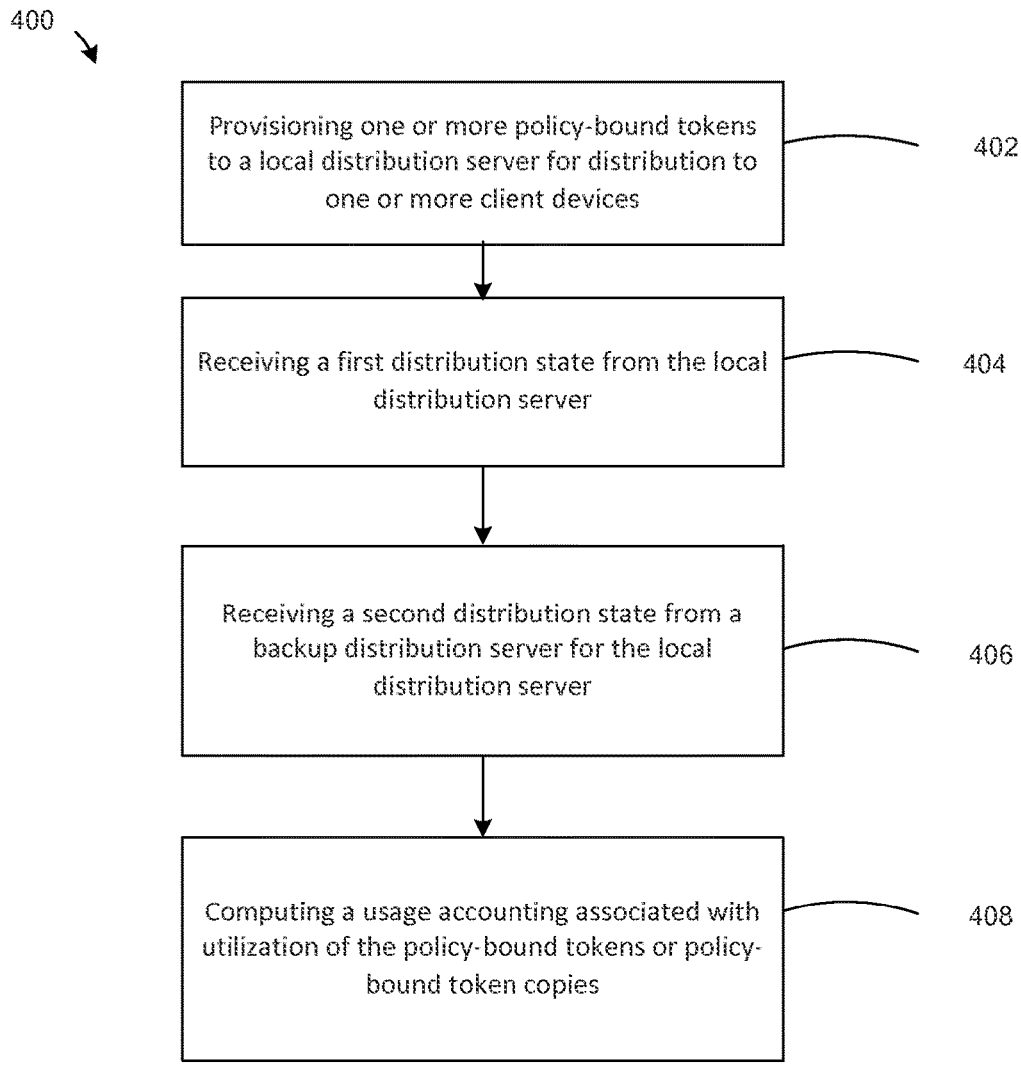
FIG. 4 is a flow chart illustrating a method of operating a back-office system to synchronize distribution records, in accordance with various embodiments.

FIG. 4 is a flow chart illustrating a method 400 of operating a back-office system (e.g., the back-office system 102 of FIG. 1) to synchronize distribution records to reduce overage states, in accordance with various embodiments. The method 400 can begin at step 402 when the back-office system provisions one or more policy-bound tokens (e.g., licenses or authorization codes) to a local main distribution server (e.g., the local main distribution server 112 of FIG. 1) for distribution to one or more client devices. Step 402 can also include policy-bound token copies to a local backup distribution server (e.g., local backup distribution server 122 of FIG. 1) for distribution to the one or more client devices when a distribution service of the local main distribution server is unavailable.

Then at step 404, the back-office system can receive a first distribution state from the local main distribution server. The first distribution state can indicate a first set of one or more distribution transaction records involving the policy-bound tokens. The distribution transaction records can originate from the local main distribution server or another server, such as the local backup distribution server, or any combination thereof. For example, a distribution transaction record in the first distribution state can originate from another server when the other server sends the distribution transaction record to the local main distribution server for safekeeping in case that other server becomes unavailable (e.g., network failure, service failure, or server hardware failure).

At step 406, the back-office system receives a second distribution state from the local backup distribution server. The second distribution state can be indicative of a second set of one or more distribution transaction records involving at least a subset of the policy-bound token copies. The second set of distribution transaction records can also involve a subset of the policy-bound token copies. In some embodiments, the second set of distribution transaction records can also include transaction records originated on the local main distribution server.

At step 408, the back-office system can compute, according to a distribution policy, a usage accounting associated with utilization of the policy-bound tokens or policy-bound token copies. For example, the usage account can include fees associated with utilization of the policy-bound tokens or the policy-bound token copies. For example, computing the usage accounting can include identifying a duplicate distribution transaction record between the first distribution state and the second distribution state and deducting the duplicate distribution transaction record from the usage accounting.

For example, the back-office system can identify the duplicate distribution transaction record by comparing a first transaction ID of a first distribution transaction record reflected in the first distribution state against a second transaction ID of a second distribution transaction record reflected in the second distribution state. The back-office system can then determine that the first distribution transaction record and the second distribution transaction record are duplicates of one another when the first transaction ID and the second transaction ID are identical. When the first transaction ID and the second transaction ID are identical, the back-office system can identify one of the first distribution transaction and the second distribution transaction as the duplicate distribution transaction record to avoid double billing in the usage accounting. In embodiments with comprehensive synchronization between at least the local main distribution server and the local backup distribution server (e.g., servers that share concurrent licenses), license leakage can be prevented, such as per-per-use leakage.

Figure 5:
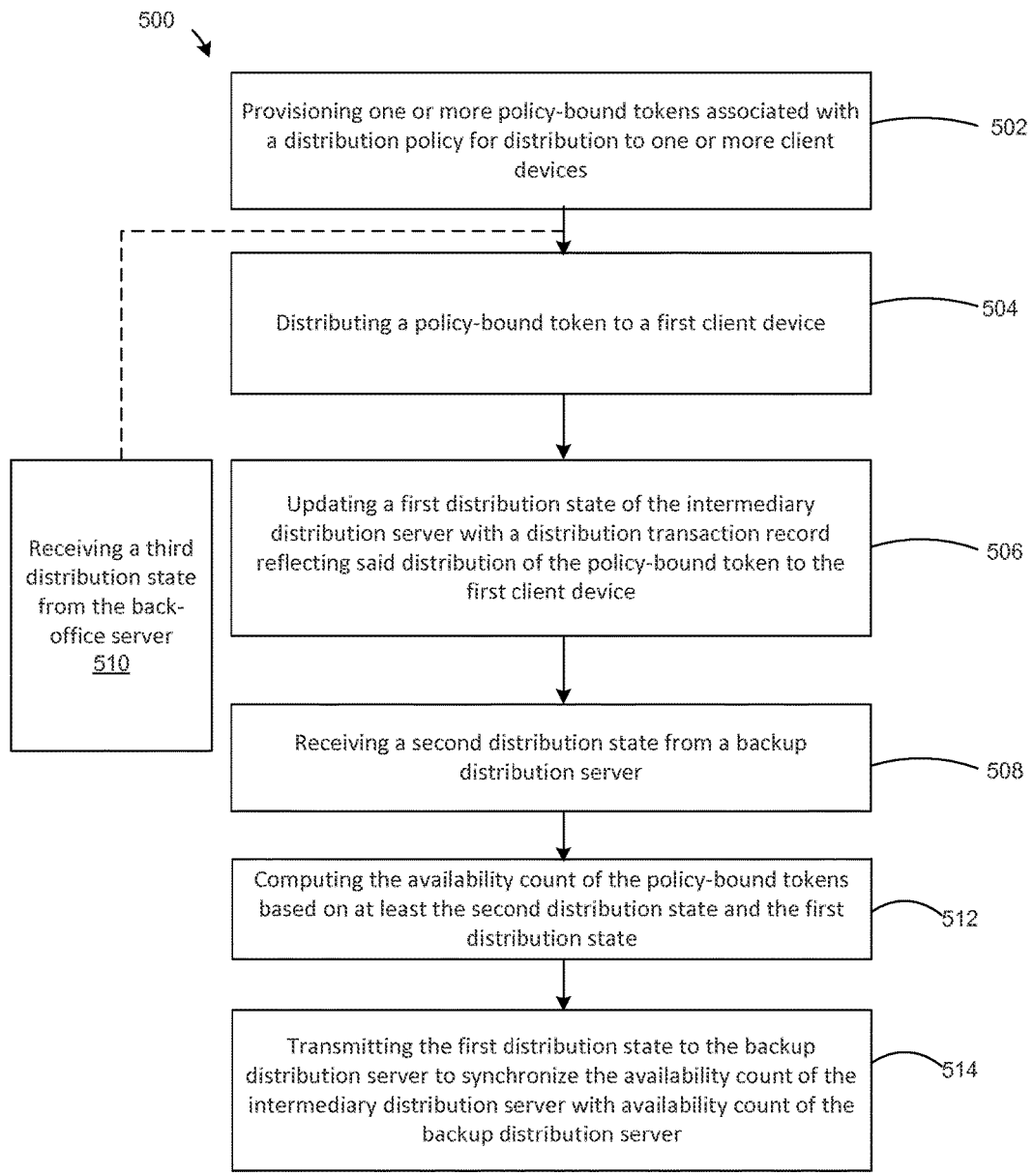
FIG. 5 is a flow chart of a method of operating an intermediary distribution server to synchronize distribution records, in accordance with various embodiments.

FIG. 5 is a flow chart of a method 500 of operating an intermediary distribution server (e.g., the local main distribution server 112 of FIG. 1) to synchronize distribution records to reduce overage states, in accordance with various embodiments. At step 502, the intermediary distribution server provisions one or more policy-bound tokens (e.g., one or more licenses, passcodes, or other digital tokens) associated with a distribution policy for distribution to one or more client devices. For example, the policy-bound tokens can be pay-per-use licenses. The intermediary distribution server can provision (e.g., make the tokens available for distribution after receiving the tokens from a back-office server) the policy-bound tokens from the back-office server (e.g., the back-office system 102 of FIG. 1). Each of the policy-bound tokens can be usable to authorize a client device to utilize a resource protected by the distribution policy. The back-office server is an authoritative source of the policy-bound tokens that is responsible for accounting utilization of the policy-bound tokens by the client devices. For example, the protected resource can be an application service or a data service provided by an agent application in the first client device controlled by the back-office server. For another example, the protected resource can be an application service or a data service provided by the back-office server or a computer server separate from the licensing server, the local backup distribution server, and the back-office server.

After the provisioning, the intermediary distribution server can distribute a policy-bound token to a first client device at step 504. When distributing the policy-bound token, the intermediary distribution server can check against an availability count of the policy-bound tokens. When the availability count is positive, then the intermediary distribution server can proceed with the distribution at step 504. When the availability count is zero or negative, then the intermediary distribution server can prevent the distribution at step 504.

At step 506, the intermediary distribution server updates a first distribution state of the intermediary distribution server with a distribution transaction record reflecting said distribution of the policy-bound token to the first client device. In some embodiments, step 506 includes the intermediary distribution server generating a unique transaction ID associated with the distribution transaction record. In some embodiments, the updating can be responsive to the distribution of the policy-bound token to the first client device.

At step 508, the intermediary distribution server receives a second distribution state from a local backup distribution server (e.g., the local backup distribution server 122 of FIG. 1). The local backup distribution server provides a redundant distribution service. For example, the redundant distribution service can provide policy-bound token copies to the client devices when a distribution service of the intermediary distribution server is unavailable. In some embodiments, the intermediary distribution server also receives a third distribution state from the back-office server at step 510. In several embodiments, the back-office server would send the third distribution state to the intermediary distribution server during a recovery operation (e.g., in response to restarting the intermediary distribution server). In these embodiments, the synchronization of the third distribution state to the intermediary distribution server occurs a single time during a running session of the intermediary distribution server.

At step 512, the intermediary distribution server computes, according to the distribution policy, the availability count of the policy-bound tokens based on at least the second distribution state and the first distribution state. The availability count dictates how many of the policy-bound tokens are authorized for distribution. In some embodiments, the intermediary distribution server computes the availability count based on the first distribution state and/or the second distribution state.

The intermediary distribution server can compute the availability count by determining a list of one or more unique distribution transaction records based on any combination of the first distribution state and the second distribution state. For example, the intermediary distribution server can identify a newly received distribution transaction record from the first distribution state and/or the second distribution state as being a duplicate record that is already referenced in the list. The intermediary distribution server can then prevent the duplicate record from being included in the list again.

For another example, the intermediary distribution server can identify a duplicate distribution transaction record amongst the first distribution state, the second distribution state, and the third distribution state. The intermediary distribution server can then prevent the duplicate record from being included more than once in the list, such as by adding only one of the first distribution transaction and the second distribution transaction to the list. When identifying the duplicate distribution transaction record, the intermediary distribution server can compare a first transaction ID of a first distribution transaction record reflected in the first distribution state against a second transaction ID of a second distribution transaction record reflected in the second distribution state. Similarly, the intermediary distribution server can compare transaction IDs of different distribution transaction records in the first distribution state and the third distribution state or in the second distribution state and the third distribution state. After the comparison, the intermediary distribution server determines that the first distribution transaction record and the second distribution transaction record are duplicates of one another when the first transaction ID and the second transaction ID are identical. Accordingly, the intermediary distribution server then selects one of the first distribution transaction and the second distribution transaction as the duplicate distribution transaction record.

In some embodiments, at step 514, the intermediary distribution server transmits the first distribution state to the local backup distribution server and the back-office server to synchronize the availability count of the intermediary distribution server with respective availability counts of the local backup distribution server. In some embodiments, the intermediary distribution server can transmit the first distribution state and/or the second distribution state to the back-office server.

Figure 6:
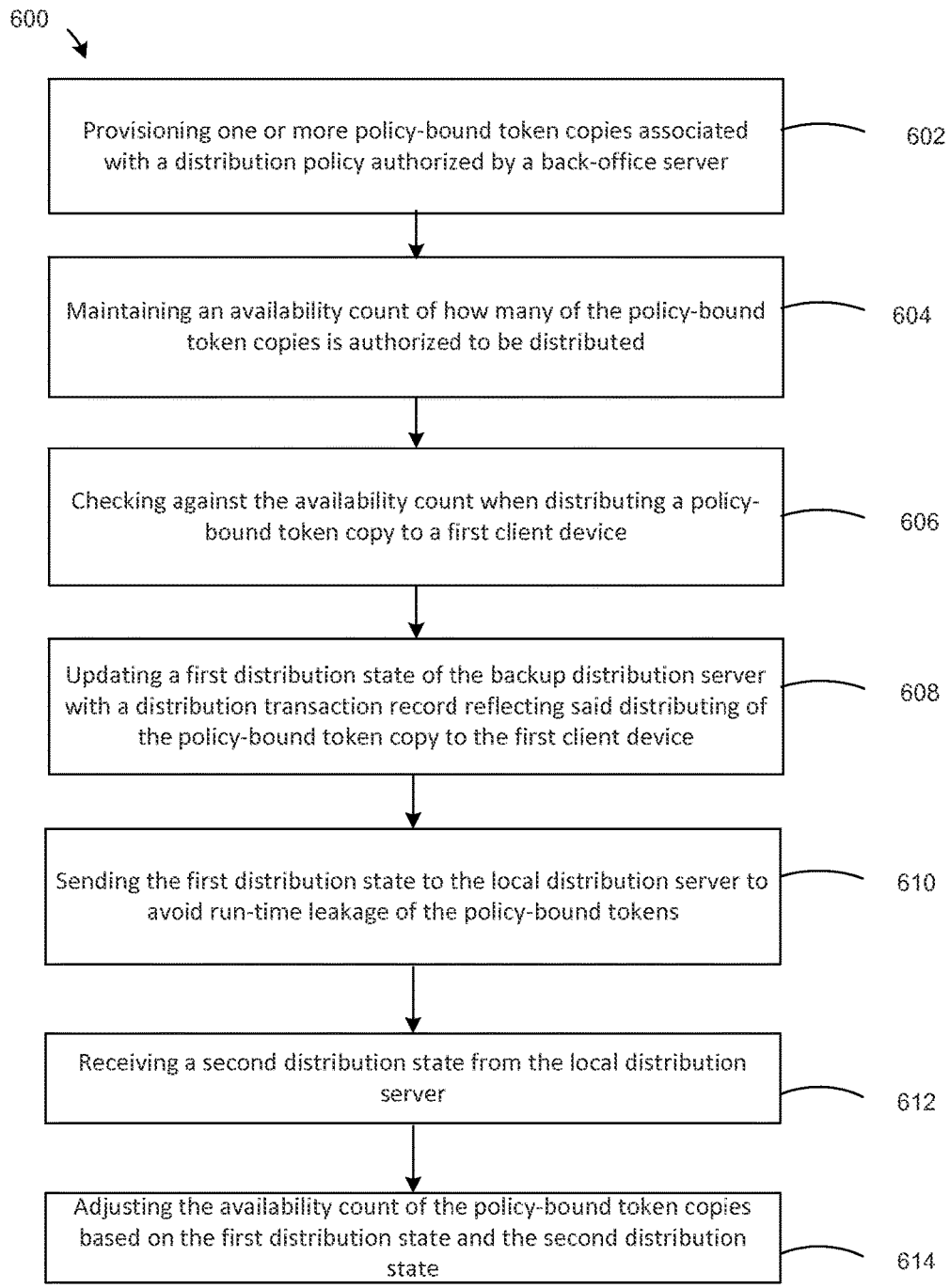
FIG. 6 is a flow chart illustrating a method of operating a backup server to synchronize distribution records, in accordance with various embodiments.

FIG. 6 is a flow chart illustrating a method 600 of operating a backup server (e.g., the local backup distribution server 122 of FIG. 1) to synchronize distribution records to reduce overage states, in accordance with various embodiments. At step 602, the backup server provisions one or more policy-bound token copies associated with a distribution policy authorized by a back-office server (e.g., the back-office system 102 of FIG. 1). The policy-bound token copies are replicas of policy-bound tokens in a local main distribution server (e.g., the local main distribution server 112 of FIG. 1). The back-office server or the local main distribution server can provision the replicas in the backup server to serve one or more client devices when the local main distribution server is unavailable. Each of the policy-bound token copies is usable to authorize a client device to utilize a resource protected by the distribution policy.

At step 604, the backup server maintains an availability count of how many of the policy-bound token copies is authorized to be distributed. At step 606, the backup server checks against the availability count when distributing a policy-bound token copy to a first client device. At step 608, the backup server updates a first distribution state of the local backup distribution server with a distribution transaction record reflecting said distributing of the policy-bound token copy to the first client device. At step 610, the backup server sends the first distribution state to the local main distribution server. In some embodiments, step 610 can occur before step 604.

In several embodiments, at step 612, the backup server receives a second distribution state from the local main distribution server and, at step 614, adjusts the availability count of the policy-bound token copies based on the first distribution state and the second distribution state. The backup server can adjust the availability count by reducing duplicate records within the combination of distribution states (e.g., its own distribution state and received distribution state). The second distribution state and/or the third distribution state can include one or more distribution transaction records involving the policy-bound tokens, the policy-bound token copies, or other copies of the policy-bound tokens. Steps 612 and 614 can occur after step 610 as illustrated, or any time after the provisioning of the policy-bound token copies at step 602.

While processes or blocks are presented in a given order in FIG. 5, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 7:
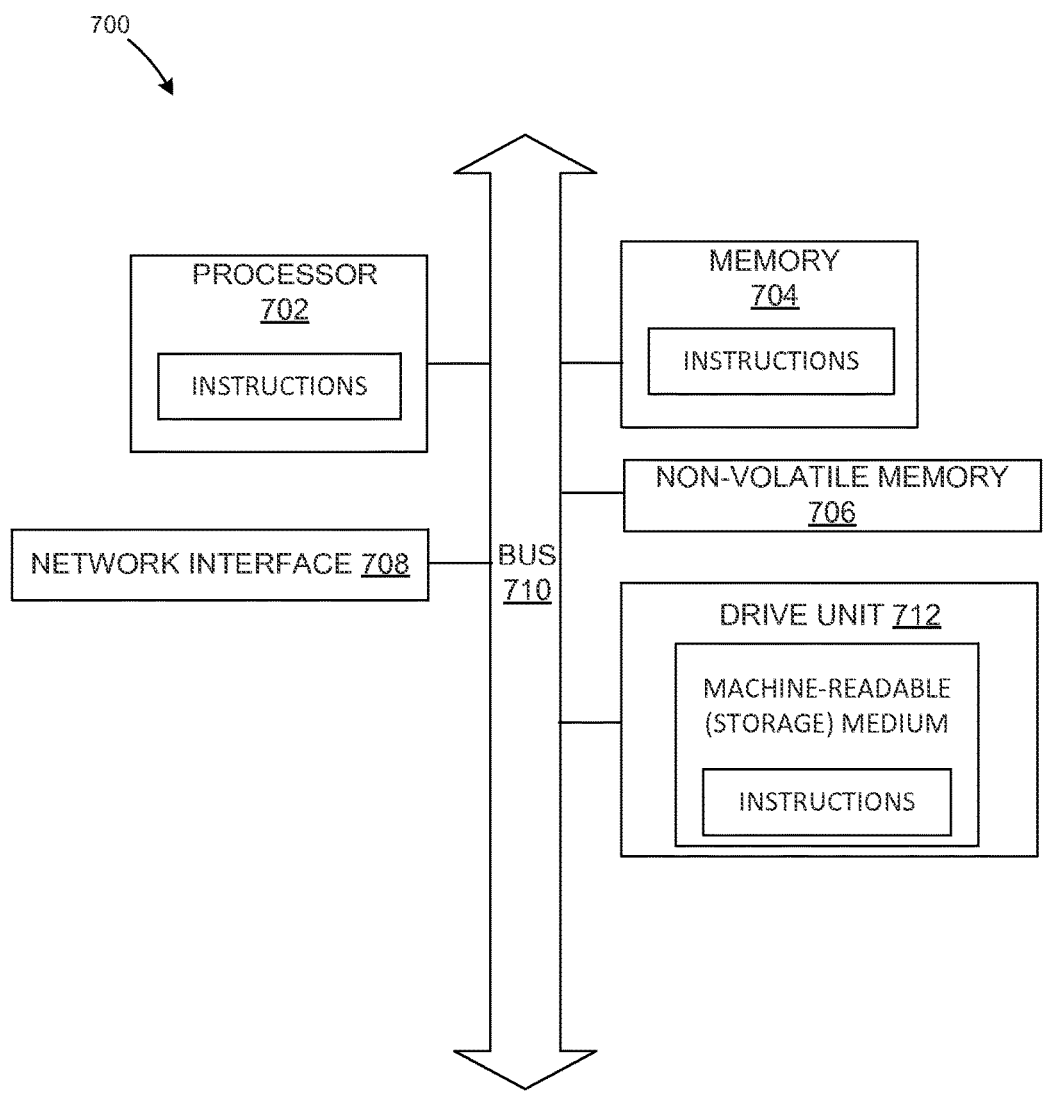
FIG. 7 is a diagrammatic representation of a machine in the example form of a computer system within which a set of instructions, for causing the machine to perform any one or more of the methodologies or modules discussed herein, may be executed.

FIG. 7 is a block schematic diagram that depicts a machine in the exemplary form of a computer system 700, within which a set of instructions for causing the machine to perform any of the herein disclosed methodologies (e.g., FIGS. 4-6) may be executed. For example, the computer system 700 can implement the client device 200 of FIG. 2 or the distribution server 300 of FIG. 3. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken. The computer system 700 is intended to illustrate a hardware device on which any of the instructions, processes, modules and components depicted in the figures above (and any other processes, techniques, modules and/or components described in this specification) can be implemented. As shown, the computer system 700 includes a processor 702, memory 704, non-volatile memory 706, and a network interface 708. Various common components (e.g., cache memory) are omitted for illustrative simplicity. The computer system 700 can be of any applicable known or convenient type, e.g., a personal computer (PC), server-class computer or mobile device (e.g., smartphone, card reader, tablet computer, etc.). The components of the computer system 700 can be coupled together via a bus and/or through any other known or convenient form of interconnect.

One of ordinary skill in the relevant art will recognize that the terms "machine-readable (storage) medium" or "computer-readable (storage) medium" include any type of device that is accessible by the processor 702. The memory 704 is coupled to the processor 702 by, for example, a bus 710. The memory 704 can include, by way of example but not limitation, random access memory (RAM), e.g., dynamic RAM (DRAM) and static RAM (SRAM). The memory 704 can be local, remote, or distributed.

The bus 710 also couples the processor 702 to the non-volatile memory 706 and drive unit 712. The non-volatile memory 706 may be a hard disk, a magnetic-optical disk, an optical disk, a read-only memory (ROM), e.g., a CD-ROM, Erasable Programmable Read-Only Memory (EPROM), or Electrically Erasable Programmable Read-Only Memory (EEPROM), a magnetic or optical card, or another form of storage for large amounts of data. The non-volatile memory 706 can be local, remote, or distributed.

The data structures, modules, and instruction steps described in the figures above may be stored in the non-volatile memory 706, the drive unit 712, or the memory 704. The processor 702 may execute one or more of the modules stored in the memory components.

The bus 710 also couples the processor 702 to the network interface 708. The network interface 708 can include one or more of a modem or network interface. A modem or network interface can be considered to be part of the computer system 700. The network interface 708 can include an analog modem, ISDN modem, cable modem, token ring interface, satellite transmission interface (e.g. "direct PC"), or other interfaces for coupling a computer system to other computer systems.

It is to be understood that embodiments may be used as or to support software programs or software modules executed upon some form of processing core (e.g., the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Some embodiments of the disclosure have other aspects, elements, features, and steps in addition to or in place of what is described above. These potential additions and replacements are described throughout the rest of the specification. For example, some embodiments involve a computer server in a digital supply management system. The computer server can include: a network device adapted to communicate with at least a local network and an external global network; a trusted storage configured to store a set of licenses, fulfillment records of the set of the licenses, and a distribution hierarchy associated with the set of the licenses; and a processor configured by executable instructions to implement a vendor daemon to request verification of the set of the licenses with a trusted authority over the external global network or with a parent distribution server over the local network. The processor can be further configured to distribute at least a subset of the licenses to one or more recipient computing devices over the local network. The distribution hierarchy can include a supply chain that indicates computing servers accountable for sourcing the set of the licenses. The supply chain can include the parent distribution server and the trusted authority. The distribution hierarchy can also include a descendent hierarchy indicative of descendent computing devices that directly or indirectly received the subset of the licenses. The descendent computing devices can include the recipient computing devices.

What is claimed is:

1. A digital policy enforcement system comprising:
a local main distribution server, implemented by a hardware processor, provisioned with one or more policy-bound licenses associated with a distribution policy, wherein the local main distribution server is configured to:
maintain, based one or more distribution transaction records involving at least a subset of the policy-bound licenses having been distributed to one or more client devices, a main client distribution state indicative of an availability count of the policy-bound licenses for distribution;
communicate the main client distribution state to a local backup distribution server and a back-office server;
receive a backup client distribution state from the local backup distribution server; and
adjust, according to the distribution policy, the availability count of the policy-bound licenses based on the backup client distribution state;
the local backup distribution server, implemented by a hardware processor, provisioned with one or more policy-bound license copies associated with the policy-bound licenses in the local main distribution server, wherein the policy-bound license copies are duplicates to the policy bound licenses in the local main distribution server;
wherein the local backup distribution server is configured to:

maintain the backup client distribution state indicating availability of the policy-bound license copies for distribution;

receive the main client distribution state of the local main distribution server;

adjust the availability of the policy-bound license copies based on the main client distribution state; and communicate the backup client distribution state to the local main distribution server and a back-office server.

2. The digital policy enforcement system of claim 1, wherein the local backup distribution server is configured to communicate the backup client distribution state to the local main distribution server more frequently than communication to the back-office server.

3. The digital policy enforcement system of claim 1, wherein the local main distribution server is configured to communicate the main client distribution state to the local backup distribution server more frequently than communication to the back-office server.

4. The digital policy enforcement system of claim 1, wherein the local main distribution server is configured to generate a unique transaction identifier for a distribution transaction record that changes the availability of the policy-bound licenses.

5. The digital policy enforcement system of claim 4, wherein, when maintaining the main client distribution state, the local attribution server is configured to record unique transaction identifiers associated with the distribution transaction records.

6. The digital policy enforcement system of claim 1, wherein the local backup distribution server is configured to generate a unique transaction identifier for a distribution transaction record that changes the availability of the policy-bound licenses.

\* \* \* \* \*